US012545028B2

(12) United States Patent
Uetsuki et al.

(10) Patent No.: US 12,545,028 B2
(45) Date of Patent: Feb. 10, 2026

(54) PRINTING APPARATUS AND MAINTENANCE METHOD HAVING A MAINTENANCE UNIT TO WIPE A DISCHARGE PORT SURFACE WIITH A WIPING MEMBER HAVING A PROPERTY TO ABSORB INKS AND A REACTION LIQUID

(71) Applicant: CANON KABUSHIKI KAISHA, Tokyo (JP)

(72) Inventors: Masaya Uetsuki, Kanagawa (JP); Keita Ishimi, Kanagawa (JP); Rie Takekoshi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/710,844

(22) Filed: Mar. 31, 2022

(65) Prior Publication Data

US 2022/0324233 A1 Oct. 13, 2022

(30) Foreign Application Priority Data

Apr. 8, 2021 (JP) ................................ 2021-065729

(51) Int. Cl.
*B41J 2/165* (2006.01)
*B41J 2/21* (2006.01)

(52) U.S. Cl.
CPC ......... *B41J 2/16535* (2013.01); *B41J 2/2114* (2013.01)

(58) Field of Classification Search
None
See application file for complete search history.

(56) References Cited

U.S. PATENT DOCUMENTS 6,231,157 B1 * 5/2001 Saijo .................... B41J 2/16538 347/33
6,527,361 B1 3/2003 Gotoh et al. .................... 347/30
(Continued)

FOREIGN PATENT DOCUMENTS

JP 2004-330750 11/2004
JP 2010-184429 8/2010
(Continued)

OTHER PUBLICATIONS

U.S. Appl. No. 17/696,559, filed Mar. 16, 2022.
(Continued)

*Primary Examiner* — Alejandro Valencia
(74) *Attorney, Agent, or Firm* — Venable LLP

(57) ABSTRACT

A printing apparatus including a printing unit having a first discharge port array with a plurality of first discharge ports in a first direction that discharge first ink, a second discharge port array with a plurality of second discharge ports in the first direction, that discharge a reaction liquid to react with the first ink, and a third discharge port array with a plurality of third discharge ports in the first direction, the third discharge ports configured to discharge a second ink different from the first, the first discharge port array, the second discharge port array, and the third discharge port array being arranged on a discharge port surface in a second direction intersecting with the first direction. A maintenance unit is configured to wipe the discharge port surface with a wiping member provided with a property to absorb the first and second ink, and the reaction liquid.

15 Claims, 10 Drawing Sheets

(56) References Cited

U.S. PATENT DOCUMENTS

| | | | | |
|---|---|---|---|---|
| 6,557,969 | B1 | 5/2003 | Murakami et al. | 347/23 |
| 6,702,421 | B2 | 3/2004 | Inui et al. | 347/23 |
| 6,752,485 | B2 | 6/2004 | Murakami et al. | 347/23 |
| 6,984,018 | B2 | 1/2006 | Uetsuki et al. | 347/33 |
| 7,210,761 | B2 * | 5/2007 | Mott | B41J 2/16535 347/29 |
| 7,527,348 | B2 | 5/2009 | Uetsuki et al. | 347/33 |
| 8,342,638 | B2 | 1/2013 | Sole Pons et al. | 347/33 |
| 8,882,232 | B2 | 11/2014 | Ibe et al. | 347/19 |
| 9,114,651 | B2 | 8/2015 | Kato et al. | H04N 1/6036 |
| 9,162,462 | B2 | 10/2015 | Komatsu et al. | B41J 2/16535 |
| 9,561,658 | B2 | 2/2017 | Danzuka et al. | B41J 2/16508 |
| 9,707,763 | B2 | 7/2017 | Nakagawa et al. | B41J 29/17 |
| 9,862,195 | B2 | 1/2018 | Genta et al. | B41J 2/16508 |
| 10,369,797 | B2 | 8/2019 | Genta et al. | B41J 2/16508 |
| 2007/0247484 | A1 * | 10/2007 | Sanada | B41J 2/16538 347/23 |
| 2009/0201329 | A1 | 8/2009 | Uetsuki et al. | 347/14 |
| 2010/0203247 | A1 | 8/2010 | Kariya et al. | B05D 5/06 |
| 2011/0050788 | A1 | 3/2011 | Imamura et al. | B41J 2/015 |
| 2014/0218440 | A1 | 8/2014 | Komatsu et al. | B41J 2/165 |
| 2015/0298475 | A1 | 10/2015 | Kuypers et al. | B41J 29/393 |
| 2017/0080714 | A1 * | 3/2017 | Suzuki | B41J 2/16535 |
| 2021/0062029 | A1 * | 3/2021 | Seguchi | C09D 11/40 |
| 2021/0107285 | A1 * | 4/2021 | Kanazawa | B41J 2/1721 |

FOREIGN PATENT DOCUMENTS

| | | |
|---|---|---|
| JP | 2011-046170 | 3/2011 |
| JP | 2011-051209 | 3/2011 |
| JP | 2012-126090 | 7/2012 |
| JP | 2014-148128 | 8/2014 |
| JP | 2017-193064 | 10/2017 |
| JP | 2018-001462 | 1/2018 |

OTHER PUBLICATIONS

U.S. Appl. No. 17/829,651, filed Jun. 1, 2022.

Office Action dated Dec. 17, 2024 in counterpart Japanese Application No. 2021-065729, together with English translation thereof.

* cited by examiner

PRINTING APPARATUS AND MAINTENANCE METHOD HAVING A MAINTENANCE UNIT TO WIPE A DISCHARGE PORT SURFACE WIITH A WIPING MEMBER HAVING A PROPERTY TO ABSORB INKS AND A REACTION LIQUID

CROSS REFERENCE TO PRIORITY APPLICATION

This application claims the benefit of Japanese Patent Application No. 2021-065729, filed Apr. 8, 2021, which is hereby incorporated by reference herein in its entirety.

BACKGROUND OF THE INVENTION

Field of the Invention

The present invention relates to a printing apparatus that wipes a discharge port surface provided with discharge ports of a discharge head to discharge inks to a print medium, and to a maintenance method for favorably maintaining and recovering a state of discharge of the inks from the discharge head.

Description of the Related Art

U.S. Pat. No. 8,342,638 discloses a technique for removing a sticking substance such as an ink that adheres to a discharge port surface of a discharge head provided with discharge ports for discharging the ink. To be more precise, this technique aims to remove the sticking substance that sticks to the discharge port surface by wiping while pressing an absorptive wiping member against the discharge port surface. Here, the sticking substance includes adhering mist originating from a pool or a splash of an ink at discharge ports at the time of ink discharge, dust in the air, fibers deriving from a print medium, and so forth.

The technique disclosed in U.S. Pat. No. 8,342,638 is configured to wipe the discharge port surface with the wiping member, and the wiping member therefore comes into contact with meniscus surfaces at the respective discharge ports. For this reason, the ink inside the discharge ports may seep out to the wiping member. Particularly, in a case when a printing apparatus that is capable of discharging a reaction liquid for promoting agglutination of a solid content dispersed in the ink uses the reaction liquid prepared by dissolving a reactive component into a solvent, the reaction liquid seeps out to a wider range of the wiping member than the solid content does in the state of being dispersed in the ink. The reaction liquid that seeps out of the discharge ports reaches a region of the wiping member used for wiping the ink, the solid component in the ink such as a pigment is agglutinated. This agglutinate may stick to the discharge port surface at the time of a wiping operation, and may cause a discharge failure from any of the discharge ports.

SUMMARY OF THE INVENTION

The present invention has been made in view of the above-mentioned problem. The present invention provides a technique for suppressing a discharge failure at a discharge port to be caused by a reaction of a reaction liquid with an ink at the time of a wiping operation.

In a first aspect of the present invention, a printing apparatus includes a printing unit including a first discharge port array formed by arranging a plurality of discharge ports in a first direction, the discharge ports being configured to discharge an ink, and a second discharge port array formed by arranging a plurality of discharge ports in the first direction, the discharge ports being configured to discharge a reaction liquid to react with the ink, the first discharge port array and the second discharge port array being arranged on a discharge port surface in a second direction intersecting with the first direction, and a maintenance unit configured to wipe the discharge port surface by using a wiping member provided with a property to absorb the ink and the reaction liquid, wherein the discharge port surface is wiped in the first direction with the wiping member by relatively moving at least one of the printing unit and the maintenance unit, and a first wiping portion of the wiping member to wipe the first discharge port array and a second wiping portion of the wiping member to wipe the second discharge port array are located in different positions in the first direction.

In a second aspect of the present invention, a maintenance method for a printing apparatus including a printing unit including a first discharge port array formed by arranging a plurality of discharge ports in a first direction, the discharge ports being configured to discharge an ink, and a second discharge port array formed by arranging a plurality of discharge ports in the first direction, the discharge ports being configured to discharge a reaction liquid to react with the ink, the first discharge port array and the second discharge port array being arranged on a discharge port surface in a second direction intersecting with the first direction, and a maintenance unit configured to wipe the discharge port surface by using a wiping member provided with a property to absorb the ink and the reaction liquid, the maintenance method including wiping the discharge port surface in the first direction by relatively moving at least one of the printing unit and the maintenance unit and by using a first wiping portion to wipe the first discharge port array and a second wiping portion to wipe the second discharge port array, the first and second wiping portions being located in different positions in the first direction of the wiping member.

According to the present invention, it is possible to suppress a discharge failure at a discharge port, which is caused by a reaction of a reaction liquid with an ink at the time of a wiping operation.

Further features of the present invention will become apparent from the following description of exemplary embodiments with reference to the attached drawings.

DESCRIPTION OF THE EMBODIMENTS

A printing apparatus and a maintenance method according to an embodiment will be described below in detail with reference to the accompanying drawings. It is to be noted that the following embodiment does not intend to limit the scope of the present invention and that all the combinations of the features described in the embodiment in solution of the present invention are not always essential. Moreover, relative positions, shapes, and the like, of the configuration described in the embodiment are mere examples and are not intended to limit the scope of the present invention only to these examples.

The following description will be given of an example of a printing apparatus that adopts an ink jet printing method. Such a printing apparatus may be a single-function printer that has a printing function only, or a multiple-function printer that has multiple functions such as the printing function, a facsimile function, a scanner function, and so forth. Alternatively, the printing apparatus may be a manufacturing apparatus for manufacturing any of a color filter, an electronic device, an optical device, a microstructure, and the like, in accordance with a prescribed printing method.

Meanwhile, the term "printing" is not limited only to the formation of significant information such as characters and graphics, but it also applies to all types of information, both significant and unimportant. Moreover, the information to be formed may be or may not be a manifest image that is visually recognizable to the human eye, and the printing also includes a case of forming an image, a design, a pattern, a structure, and the like, broadly on a print medium or a case of processing a medium. The "print medium" not only includes paper used in general printing apparatuses but also broadly includes media that can accept an ink as typified by cloth, plastic films, metal plates, glass, ceramics, resins, wood, leather, and the like.

<Configuration of Printing Apparatus>

Figure 1:
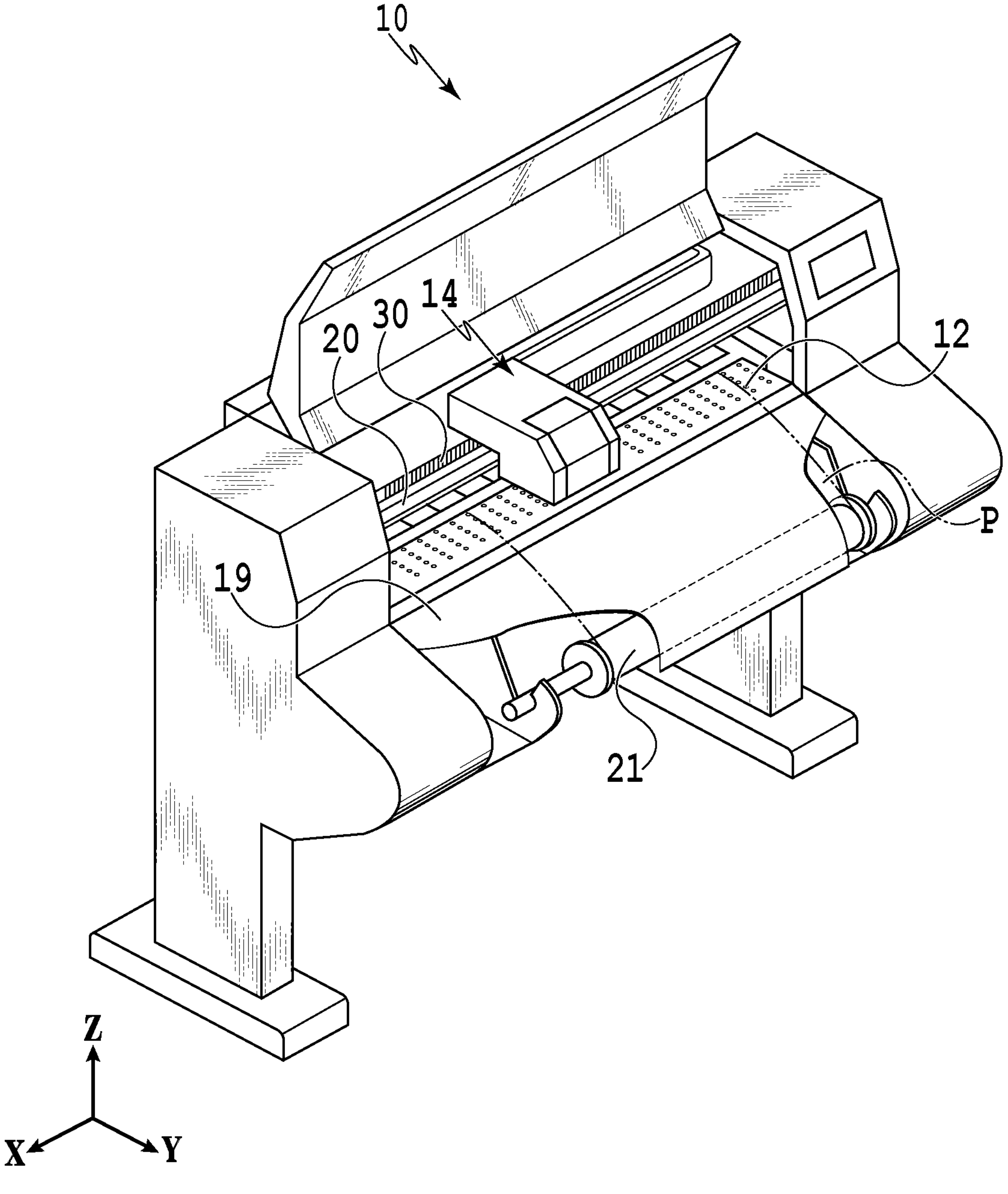
FIG. 1 is a schematic configuration diagram of a printing apparatus according to an embodiment.
Figure 2A:
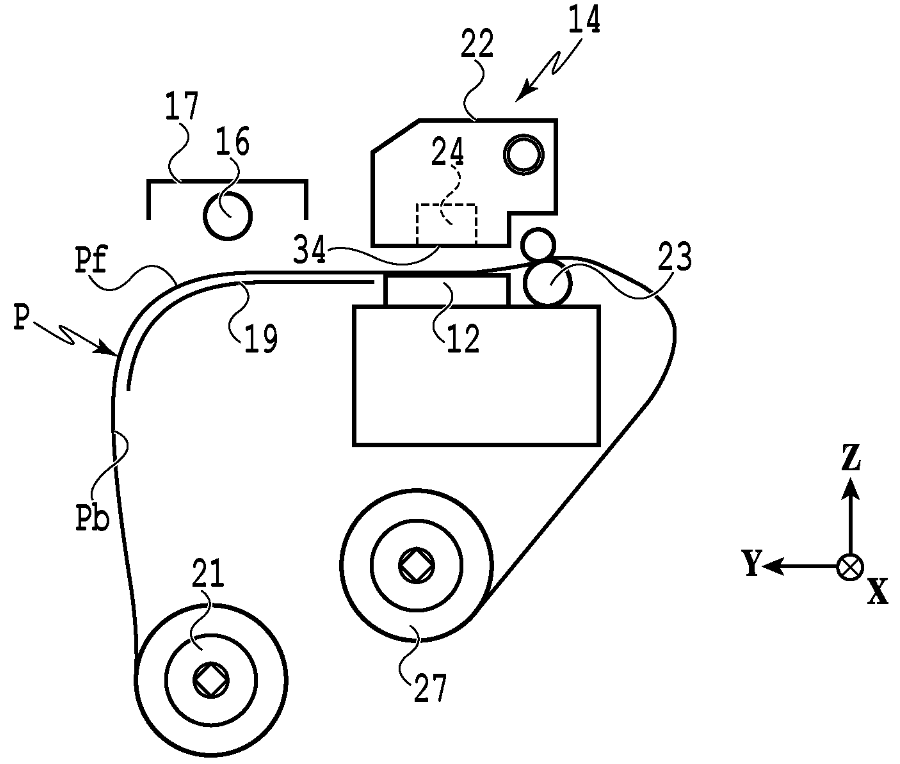
FIGS. 2A and 2B are schematic configuration diagrams of a principal part of the printing apparatus in FIG. 1.
Figure 2B:
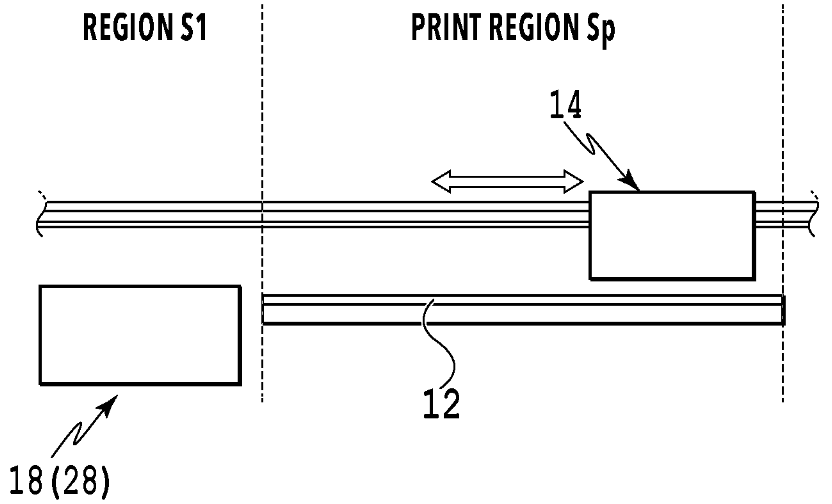

FIG. 1 is a schematic configuration diagram of a printing apparatus according an embodiment. FIG. 2A is a diagram for explaining a heating portion in the printing apparatus and FIG. 2B is a diagram for explaining a recovery portion in the printing apparatus. A printing apparatus 10 in FIG. 1 is an ink jet printing apparatus of a so-called serial scan type, which discharges inks onto a conveyed print medium in accordance with an ink jet method while moving in a direction intersecting (at right angle in the present embodiment) with a direction of conveyance.

The printing apparatus 10 includes a platen 12 configured to support a print medium P conveyed by a conveyance portion (not shown), and a printing portion 14 configured to print on the print medium P supported by the platen 12. Moreover, the printing apparatus 10 includes a heating portion 16 (see FIG. 2A) configured to heat a printed surface Pf of the print medium P after being subjected to printing, and a recovery portion 18 (see FIG. 2B) configured to favorably maintain and to recover a state of discharge of an ink in the printing portion 14. Here, overall operations of the printing apparatus 10 are controlled by a control portion 100 (to be described later).

The conveyance portion conveys sheet-shaped print media unrolled and fed from rolled paper 27 to the platen 12 by using conveyance rollers 23 that are driven by a conveyance motor (not shown) through gears (see FIG. 2A). The print medium P after being subjected to printing is reeled in by using a spool 21. A conveyance mechanism of the conveyance portion is not limited to the foregoing and various publicly known techniques are applicable.

The printing portion 14 includes a carriage 22 that is movably provided to a guide shaft 20, and a head unit 24 that is made attachable to and detachable from the carriage 22 and configured to discharge inks to the print medium P supported by the platen 12. The guide shaft 20 extends in x direction intersecting (at right angle in the present embodiment) with y direction being a direction in which the print medium P is conveyed, and the carriage 22 is configured to be reciprocable in +x direction and −x direction along the guide shaft 20. The head unit 24 includes multiple discharge ports 32 (to be described later) for discharging the inks, and is attached to the carriage 22 such that its discharge port surface 34 provided with the discharge ports 32 (see FIG. 2B) is opposed to the platen 12. Accordingly, in the printing apparatus 10, the head unit 24 is configured to be able to discharge the inks while reciprocating in +x directions. As for a specific movement mechanism of the carriage 22, it is possible to use various publicly known techniques such as a carriage belt that transmits driving force from a carriage motor and a mechanism that employs a lead screw.

The printing apparatus 10 is provided with a linear encoder 30 that extends in the x direction, and the control portion 100 controls a position of the head unit 24 based on a signal from the linear encoder 30. Meanwhile, the head unit 24 is configured to be able to discharge inks of four colors, an emulsion liquid, and a reaction liquid that reacts with the inks and the emulsion liquid to promote solidification. The inks of the four colors are assumed to be black (K), ink, cyan (C) ink, magenta (M) ink, and yellow (Y) ink. The inks of four colors are pigment inks that contain coloring materials that take on the corresponding colors. Note that the colors of the ink and the number of the ink to be discharged are not limited only to the four colors mentioned above.

In the printing apparatus 10, the printing portion 14, that is, the head unit 24 moves at a speed of 40 inches/sec and performs printing at a resolution of 1200 dpi (1/1200 inch), for example. In a case when printing is started, the printing apparatus 10 moves the head unit 24 to a print start position and conveys the print medium P to a position by using the conveyance portion where the head unit 24 can print on the print medium P. Next, a printing operation to discharge the inks based on print data is carried out while moving (scanning with) the head unit 24 in the +x direction (or the −x direction). After completion of the printing operation, a conveyance operation is carried out so as to convey the print medium P just by a predetermined amount by using the conveyance portion. Thereafter, a printing operation to discharge the inks is carried out while moving the head unit 24 in the −x direction (or the +x direction). As described above, the printing apparatus 10 performs the printing on the print medium P by alternately executing the printing operation and the conveyance operation. Note that the present embodiment is assumed to execute multi-pass printing by causing the printing portion 14 to perform printing while scanning a unit region on the print medium several times, for example.

The heating portion 16 emits heat to the printed surface Pf of the print medium P subjected to printing by discharging the inks (and the emulsion liquid and the reaction liquid) from the printing portion 14 thereto. Thus, the inks are fixed to the printed surface Pf by heating the printed surface Pf and the inks attached to the printed surface Pf. The heating portion 16 is enclosed with a cover 17. The cover 17 has a function to efficiently reflect the heat from the heating portion 16 onto the print medium P and a function to protect the heating portion 16. Various heaters such as a sheathed heater and a halogen heater can be used as the heating portion 16. The heating portion 16 may be structured not only as a non-contact thermally conductive heater but also as a heater using hot air.

The heating portion 16 is not limited only to the structure as shown in FIG. 2A, which is configured to heat the print medium P from the printed surface Pf side. For example, the heating portion 16 may be configured to heat the print medium P from a back surface Pb by providing the heating portion 16 on a lower side in a vertical direction (an upstream side in +z direction) of a guide portion 19 that guides the print medium P after the printing and at a position on a downstream side in +y direction of the platen 12. In the meantime, a heating temperature by the heating portion 16 is set in consideration of fixation properties of the inks and productivity of printed subjects. In addition, two or more heating portions 16 may be provided.

Although details will be described later, each ink used in the printing apparatus 10 contains the pigment, resin fine particles, and a water-soluble organic solvent. Accordingly, the printing apparatus 10 can melt the resin fine particles contained in the ink by heating the resin fine particles with the heating portion 16, and fix the pigment onto the print medium by further evaporating the water-soluble organic solvent in the ink.

The ink containing the resin fine particles has a property to improve scratch resistance (the fixation property). In this regard, the heating temperature is preferably set equal to or above a minimum film-forming temperature of the resin fine particles. Moreover, the majority of a liquid component such as the water-soluble organic solvent in the ink needs to be evaporated in the course of heating. Therefore, the heating portion 16 is configured to have a temperature distribution in a direction of print medium conveyance sufficient for ensuring heating time to supply energy required for evaporating the majority of the liquid component.

The recovery portion 18 includes a maintenance portion 28 provided at a position adjacent to an end portion in the x direction of the platen 12. The maintenance portion 28 is located in a region SI on one end portion side of a print region Sp where the inks are discharged from the printing portion 14 to the print medium P supported by the platen 12. Although details will be described later, the maintenance portion 28 is configured to be able to wipe a discharge port surface 34 of the head unit 24 with a wiping member 50 (to be described later) that can absorb liquids such as the inks.

Here, the recovery portion 18 may include a structure other than the maintenance portion 28. For example, various publicly known structures for favorably maintaining and recovering the state of discharge of the inks from multiple discharge ports 32, as typified by a suctioning portion which forcibly suctions the inks from the discharge ports 32 that discharge the inks from the head unit 24, may be provided in a region on another end portion side of the print region Sp.

The printing apparatus 10 is configured to be able to discharge the reaction liquid that reacts with the inks and the emulsion liquid. Accordingly, the reaction liquid and the inks may be mixed together and solidified in an unintended condition in the printing apparatus 10, and the solidified substance thus unintentionally generated may block normal discharge from the discharge ports. A part of a configuration to avoid the above-mentioned solidification of the ink or to favorably maintain and recover the discharge of the inks from the discharge ports 32 by removing the generated solidified substance is provided independently of the inks, the emulsion liquid, and the reaction liquid. Examples of the configuration for favorably maintaining and recovering the discharge of the ink from the discharge ports 32 include a cap for protecting a discharge head 25 (to be described later) provided with discharge ports of the respective liquids, a pump to generate a negative pressure, a non-absorptive wiper for wiping the inks off the discharge port surface 34, and the like. In the present specification, the inks, the emulsion liquid, and the reaction liquid will be collectively referred to as the "liquids".

<Configuration of Head Unit>

Figure 3:
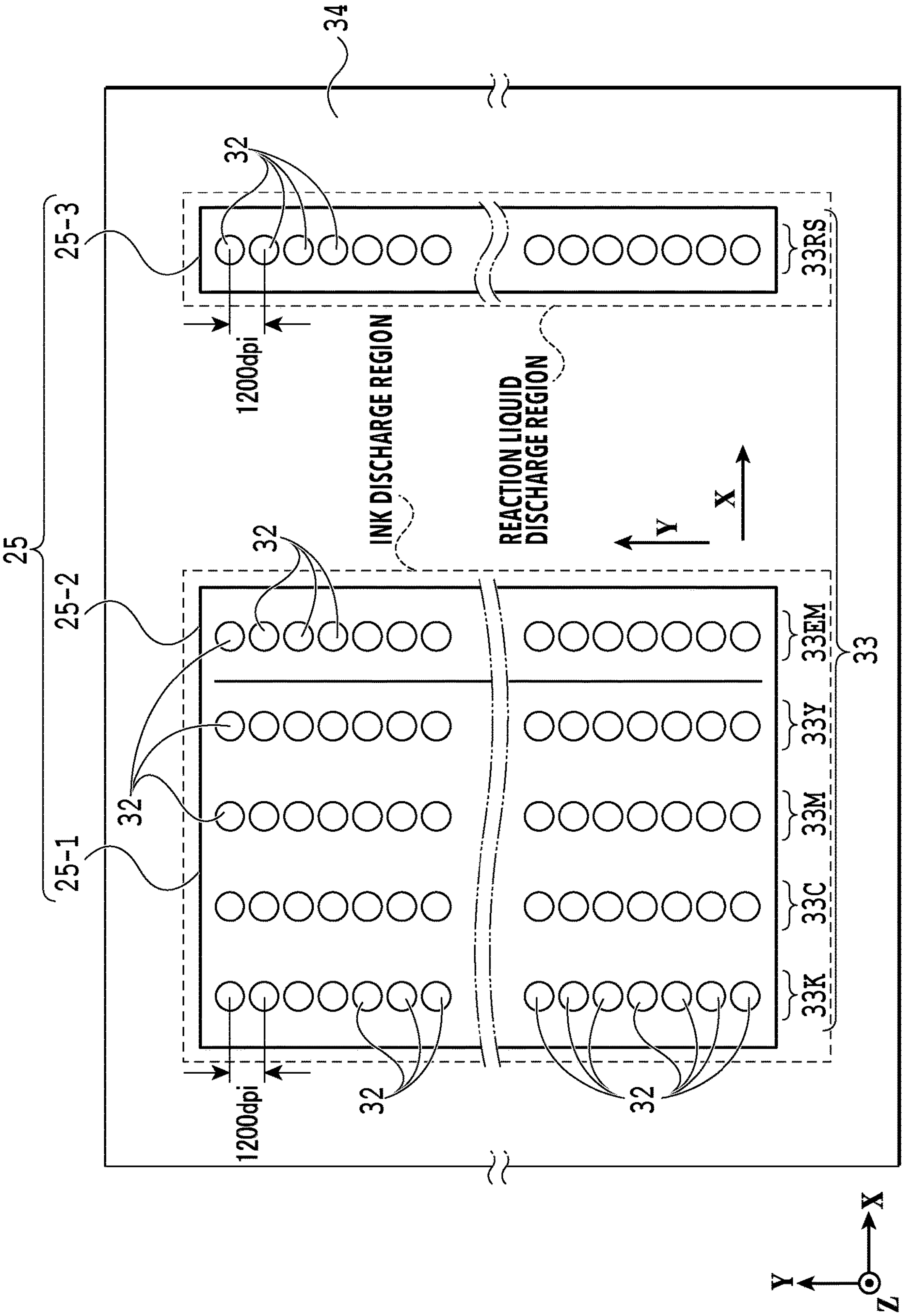
FIG. 3 is a diagram showing a discharge port surface of a head unit.

Next, a configuration of the head unit 24 will be described. FIG. 3 is a diagram showing the discharge port surface 34 of the head unit 24. Note that FIG. 3 is a diagram viewing the discharge port surface 34 in-z direction. The discharge port surface 34 of the head unit 24 includes the discharge head 25 provided with the discharge ports 32 for discharging the corresponding liquids. To be more precise, the discharge port surface 34 includes a discharge head 25-1 to discharge the inks of the four colors, a discharge head 25-2 to discharge the emulsion liquid, and a discharge head 25-3 to discharge the reaction liquid. The respective discharge heads 25 include discharge port arrays 33 each formed by arranging multiple discharge ports 32 to discharge the corresponding liquid in the y direction. In the present embodiment, each discharge port array 33 includes twelve hundred eighty discharge ports 32 arranged in the y direction with intervals equivalent to 1200 dpi. An amount of liquid discharge from each discharge port 32 is set to about 4.5 pl, for example.

A tank (not shown) that stores the corresponding liquid is connected to each discharge port array 33 and any of the inks, the emulsion liquid, and the reaction liquid is supplied from the tank. The tank may be formed integrally with the discharge head 25 and made attachable to and detachable from the carriage 22. Alternatively, the tank may be separable from the discharge head 25.

A discharge port array 33K to discharge the K ink, a discharge port array 33C to discharge the C ink, a discharge port array 33M to discharge the Mink, and a discharge port array 33Y to discharge the Y ink are formed in sequence in the discharge head 25-1 in +x direction. A discharge port array 33EM to discharge the emulsion liquid is formed in the discharge head 25-2. The discharge head 25-2 is located adjacent to a downstream side in the +x direction (the right side in FIG. 3) of the discharge head 25-1. A discharge port array 33RS to discharge the reaction liquid is formed in the discharge head 25-3. The discharge head 25-3 is located on the downstream side in the +x direction of the discharge head 25-2 at a predetermined distance away from the discharge head 25-2. In other words, in the head unit 24, the discharge port arrays 33 to discharge the inks, the discharge port array 33 to discharge the emulsion liquid, and the discharge port array to discharge the reaction liquid are formed on the same plane in the direction intersecting with the direction of extension of the respective discharge port arrays 33.

The aforementioned layout positions of the respective discharge heads 25 take into account an effect of mist that is generated in the case of discharging the liquids from the respective discharge heads 25. Specifically, the discharge head 25-3 that discharges the reaction liquid having high reactivity with the inks is located at the remotest position from the discharge head 25-1 that discharges the inks. Meanwhile, the discharge head 25-2 that ejects the emulsion liquid having relatively low reactivity with the reaction liquid is disposed between the discharge head 25-1 and the discharge head 25-3.

<Inks, Emulsion Liquid, and Reaction Liquid>

Next, a description will be given of the inks, the emulsion liquid, and the reaction liquid used in the printing apparatus 10.

=Inks=

In the present embodiment, the printing apparatus 10 can use pigment inks that contain pigments, and water-soluble resin fine particle inks that contain no pigments or a very small amounts of pigments. The pigment inks and the water-soluble resin fine particle inks contain the water-soluble organic solvent. Regarding the water-soluble resin fine particle inks, it is possible to add various substances including a surfactant, a defoaming agent, a preservative, an antifungal agent, and the like, in order to impart desired properties to the inks as appropriate.

The pigment inks and the water-soluble resin fine particle inks contain the water-soluble resin fine particles in order to bring the coloring material into close contact with the print medium and to improve the scratch resistance (the fixation property) of printed images. The resin fine particles are melted by heat. The printing apparatus 10 carries out film formation with the resin fine particles by using a heater (such as the heating portion 16) and drying of the solvent contained in the inks. In the present embodiment, the resin fine particles are polymer fine particles that exist in a state of dispersion in water. Here, the polymer fine particles that exist in the state of dispersion in the water may take the form of resin particles obtained by homopolymerization of a monomer having a dissociable group or by copolymerization of two or more substances, or a so-called self-dispersed resin fine particle dispersion element.

From the viewpoint of the scratch resistance, a glass-transition temperature (Tg) of the resin fine particles is preferably set in a range from 40° C. to 120° C. inclusive. Meanwhile, it is preferable to use deionized water as the aforementioned water. Each of the inks used in the present embodiment has a surface tension in a range from 28 to 30 dyn/cm, for example. Accordingly, it is possible to suppress the occurrence of beading on a low permeable print medium that hardly allows permeation of the inks or on a non-permeable print medium that does not allow permeation of the inks such as a coated printing paper sheet and a polyvinyl chloride sheet.

Meanwhile, from the viewpoint of preventing elution of an impurity from a member in contact with the ink or deterioration of the material constituting the member, and preventing degradation in solubility of dispersed pigment resin in the ink, a pH value of each ink is preferably set in a range from 7.0 to 10.0 inclusive. The inks used in the present embodiment adopt anionic coloring materials. Therefore, the pH values of the inks are stable on an alkaline side and are in a range from 8.5 to 9.5.

=Emulsion Liquid=

A water-soluble resin fine particle ink containing resin fine particles without containing any coloring materials can be used as the emulsion liquid, for example. In other words, the emulsion liquid is a so-called clear ink. From the viewpoint of increasing gloss and improving scratch resistance, the clear ink is used in the printing apparatus 10. For example, the emulsion liquid is used in order to equalize a difference in glossiness attributed to an uneven distribution of locations where amounts of injection of the ink containing the coloring materials are small or large, or to uneven distribution of a location where ink dots are sparsely deployed. Meanwhile, the emulsion liquid is used as an overcoat on the entire image printed with the inks containing the coloring materials for the purpose of improving the scratch resistance.

To be more precise, dots of the emulsion liquid are supplementarily distributed to portions with a small amount of injection of the inks so as not to cause a difference in glossiness. Meanwhile, the emulsion liquid is further over-coated on the dots of the inks containing the coloring materials so as to compensate for deterioration in glossiness of the portion where these dots are deployed. In the meantime, dots of the emulsion liquid are distributed to a portion where the amount of injection rapidly changes, such as an edge portion of an image, for the purpose of relaxing a change in glossiness. In the present embodiment, the emulsion liquid is a liquid having low reactivity with the reaction liquid as compared to that of the inks, or, in other words, a liquid that is less solidifiable.

=Reaction Liquid=

The reaction liquid contains a reactive component that reacts with the pigment included in each ink so as to agglutinate the pigment or to transform the pigment into a gel, a reactive component that reacts with a dye, a resin, and the like, so as to render these materials insoluble, and the like. The reactive component is a component that can destroy dispersion stability of the ink in a case when the component is mixed with the ink containing a target component that is stably dispersed in an aqueous medium by the action of an ionic group, for example. Specific examples of the reaction liquid include solutions containing polyvalent metal ions such as magnesium nitrate, magnesium chloride, aluminum sulfate, and iron oxide. As a type of an agglutinative action utilizing the aforementioned cations, it is also possible to adopt a system that uses a low-molecular-weight cationic polymer flocculant for the purpose of charge neutralization of emulsion particles and insolubilization of an anionic dissolution material.

Meanwhile, in the printing apparatus 10, it is possible to use a liquid that achieves insolubilization by use of a difference in pH value from the ink as the reaction liquid. The inks used in the ink jet printing apparatus are generally stabilized on the alkaline side attributed to the characteristics of the coloring materials, and the like. The pH values are generally in a range from about 7.0 to 10.0, and are mainly set around 8.5 to 9.5. An acidic liquid is used as the reaction liquid in order to agglutinate and solidify these inks. By mixing the above-described reaction liquid with the inks, it is possible to destroy the stabilized state by changing the pH values of the inks and to agglutinate the dispersive components.

<Maintenance Portion>

Figure 4:
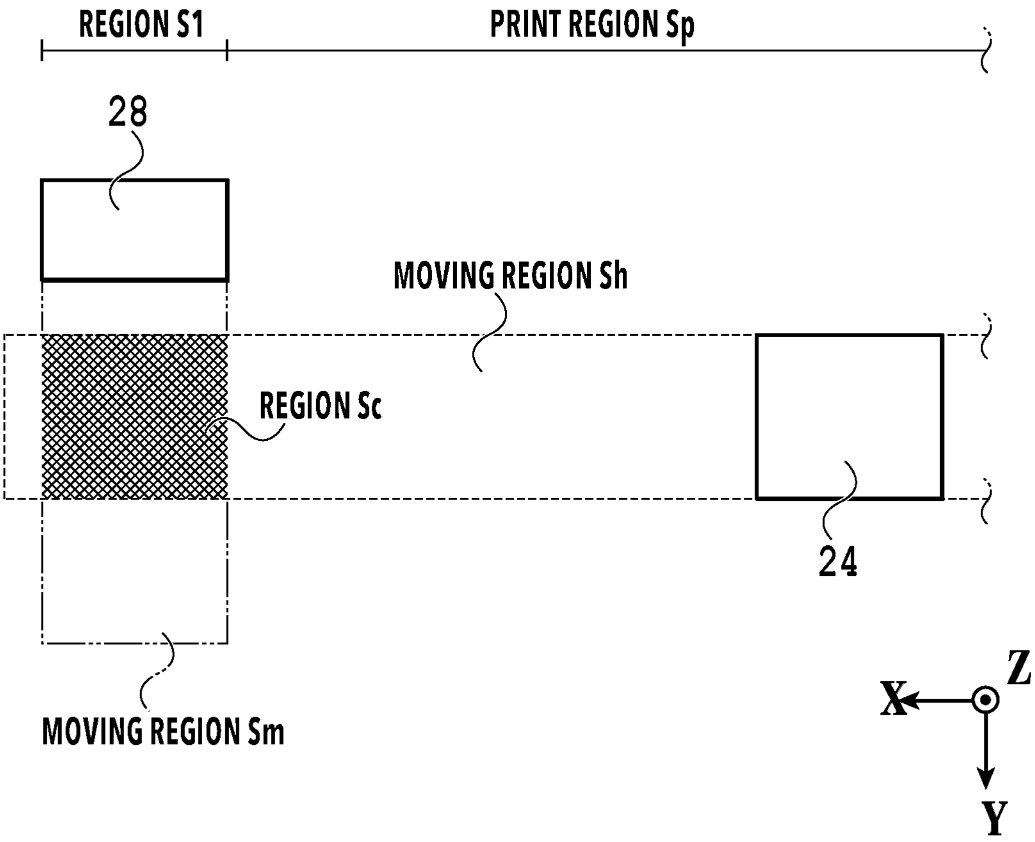
FIG. 4 is a diagram showing a moving region of the head unit and a moving region of a maintenance portion.
Figure 5:
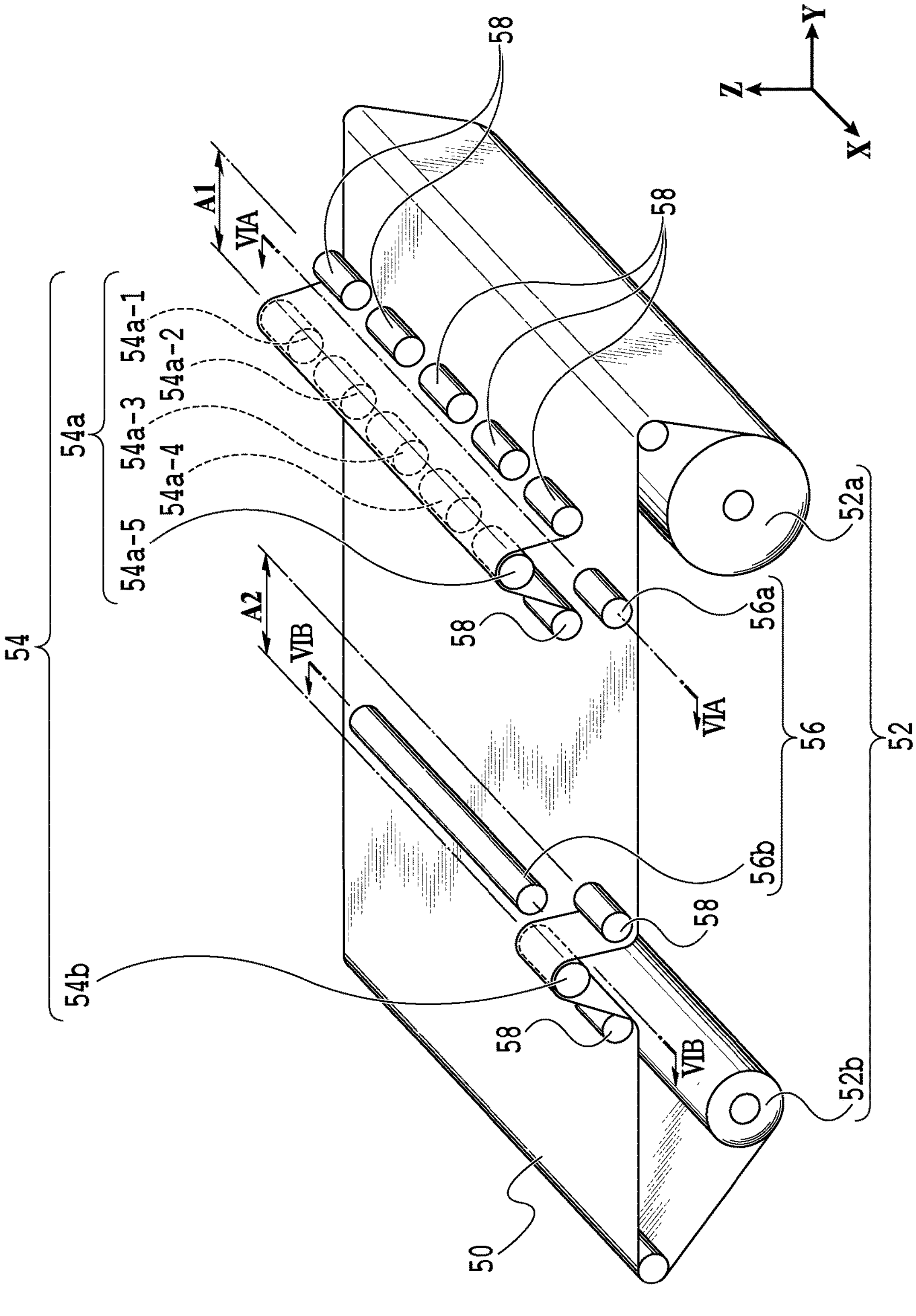
FIG. 5 is a schematic configuration diagram of the maintenance portion.
Figure 6A:
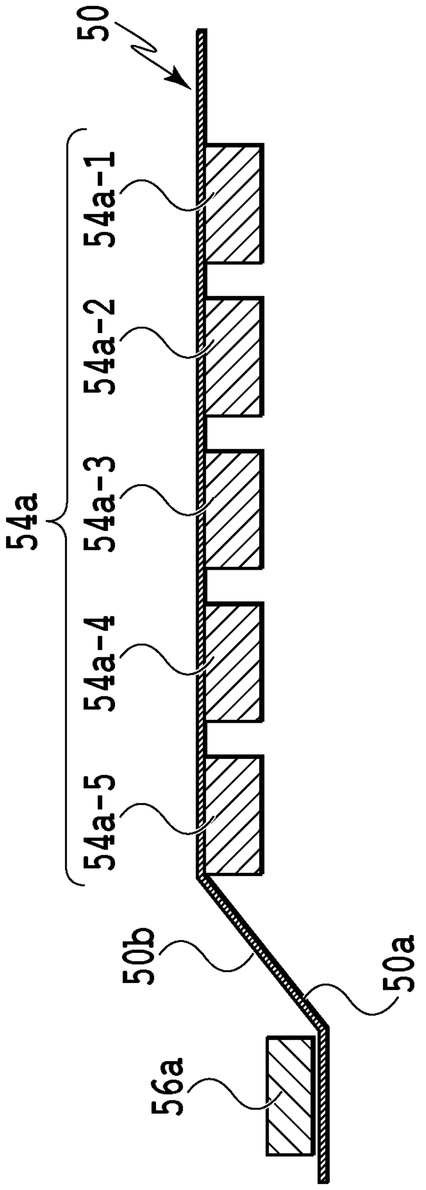
FIGS. 6A and 6B are cross-sectional views of a pressed region A1 and a pressed region A2.
Figure 6B:
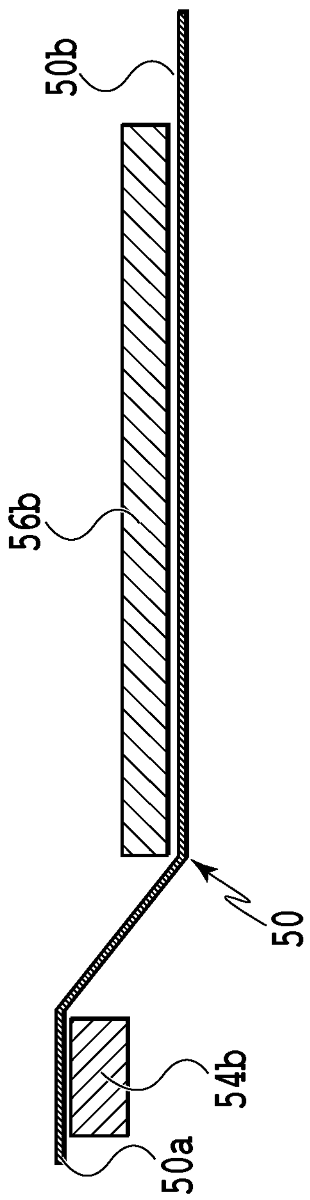

Next, a description will be given of the maintenance portion 28 in the recovery portion 18. FIG. 4 is a diagram showing a moving region of the maintenance portion and a moving region of the head unit. FIG. 5 is a schematic configuration diagram of a principal part of the maintenance portion. FIG. 6A is a cross-sectional view taken along the VIa-VIa line in FIG. 5, and FIG. 6B is a cross-sectional view taken along the VIb-VIb line in FIG. 5.

The maintenance portion 28 is provided in such a way as to be movable in the y direction in the region SI on the one end portion side of the print region Sp. A moving region Sm of the maintenance portion 28 partially overlaps a moving region Sh of the head unit 24 that moves in the x direction as shown in FIG. 4. The maintenance portion 28 is configured to be reciprocable between a first position not overlapping the moving region Sh of the head unit 24 on an upstream side in the +y direction (an upper side in FIG. 4) and a second position not overlapping the moving region Sh on a downstream side in the +y direction (a lower side in FIG. 4).

In a case when the maintenance portion 28 executes a wiping process (to be described later) on the discharge port surface 34 of the head unit 24, the maintenance portion 28 wipes the discharge port surface 34 while moving from the first position to the second position in the moving region Sm. Meanwhile, in a case when the maintenance portion 28 does not execute the wiping process, the maintenance portion 28 may be situated at a standby position located at the rearmost end (the uppermost stream side in the +y direction) in the moving region Sm, or may be situated at an arbitrary position to be defined as the first position. Here, in the case of the wiping process, the head unit 24 will be located at a wiping position in a region Sc where the moving region Sm of the maintenance portion 28 overlaps the moving region Sh of the head unit 24. This wiping position is a position where it is possible to wipe the discharge port surface 34 appropriately with the wiping member 50 by the movement of the maintenance portion 28 from the first position to the second position in the moving region Sm.

The maintenance portion 28 includes the wiping member 50, which is capable of being impregnated with a prescribed liquid and configured to come into contact with the discharge port surface 34 and to wipe a sticking substance that sticks to the discharge port surface 34 in the wiping process. Moreover, the maintenance portion 28 includes a reeling portion 52 that reels in the wiping member 50, and pressing members 54 that press the wiping member 50 in order to bring the wiping member 50 into contact with the discharge port surface 34 at a predetermined pressure. Furthermore, the maintenance portion 28 includes regulating members 56 for regulating uplift of the wiping member 50, and support members 58 located on the upstream side (the left side in FIG. 5) and the downstream side (the right side in FIG. 5) in the y direction of the pressing members 54 and configured to support the wiping member 50 by pressing the wiping member 50 in an opposite direction to a pressing direction.

Non-woven fabrics made of various base materials including polyester, nylon, rayon, polyolefin materials such as polyethylene and polypropylene, natural materials such as cotton and silk, and the like, can be used as the wiping member 50. Meanwhile, a cloth made of any of the above-mentioned materials, a woven fabric called a wiping cloth that uses materials such as split fibers that are thinner than ordinary fibers, paper, and the like, can also be used. The wiping member 50 is impregnated with the liquid for the purpose of reducing frictions during the wiping, improving performances to remove the firmly sticking substance, improving absorption of the components included in the inks such as the pigments and the polymers, and so forth.

A liquid provided with characteristics including a low evaporation characteristic, a high dispersion stability characteristic, a low fluidity characteristic, a low moisture absorbency characteristic, and the like, is used as the prescribed liquid (an impregnating liquid) to impregnate the wiping member 50. Here, the impregnating liquid does not always have to be provided with all the characteristics mentioned above, but may be provided with two or more of the above-mentioned characteristics. Meanwhile, any of diols, polyols, glycol ethers, glycol diethers, polyethylene glycol, and the like, can be used as the impregnating liquid, for example.

The maintenance portion 28 is configured to press the wiping member 50 by using the pressing members 54 and the support members 58. For this reason, the wiping member 50 is provided with appropriate stretchiness and flexibility for appropriately wiping the discharge port surface 34 without causing fracture in the case when the wiping member 50 is pressed by the pressing members 54, the support members 58, and the like.

The reeling portion 52 includes a rotary member **52*a* that reels in the unused wiping member 50, and a rotary member 52*b* that reels in the used wiping member 50. The rotary member 52*b* is located on the upstream side in the ty direction of the rotary member 52*a*. A tip end of the wiping member 50 is attached to the rotary member 52*b*, and the rotary member 52*b* reels in the wiping member 50 by being rotated under the control of the control portion 100. Meanwhile, the maintenance portion 28 wipes the discharge port surface 34 while moving in the +y direction. In this instance, the rotary members 52*a* and 52*b* are controlled by the control portion 100 in such a way as to impart tension to the wiping member 50 that is stretched between the rotary members 52*a* and 52*b***.

The pressing members 54 include a pressing member **54*a* located on the downstream side in the +y direction, and a pressing member 54*b* located on the upstream side in the +y direction. An interval in the y direction between the pressing member 54*a* and the pressing member 54*b* is determined based on the type of the liquid to be discharged from the head unit 24, the type of the impregnating liquid in the wiping member 50, and the like. Meanwhile, the pressing members 54 are configured to be able to release the pressure to the wiping member 50 by the control of the control portion 100. This configuration makes it possible to move the maintenance portion 28 in the moving region Sm without bringing the wiping member 50 into contact with the discharge port surface 34. Although FIG. 5 illustrates an end surface of the pressing member 54*a*-5 in a visible manner in order to facilitate the understanding, the end surface is actually covered with the wiping member 50**.

The pressing member **54*a* is located at a position in the x direction that corresponds to the respective discharge port arrays 33 of discharge heads 25-1 and 25-2 in the head unit 24 located at the wiping position. To be more precise, the pressing member 54*a* includes, in the x direction, a pressing submember 54*a*-1 that can press a region corresponding to the discharge port array 33K of the head unit 24 located at the wiping position, or, in other words, a region encompassing the discharge port array 33K and the vicinity thereof. Meanwhile, the pressing member 54*a* includes, in the x direction, a pressing submember 54*a*-2 that can press a region corresponding to the discharge port array 33C of the head unit 24 located at the wiping position, or, in other words, a region encompassing the discharge port array 33C and the vicinity thereof. Moreover, the pressing member 54*a* includes, in the x direction, a pressing submember 54*a*-3 that can press a region corresponding to the discharge port array 33M of the head unit 24 located at the wiping position, or, in other words, a region encompassing the discharge port array 33M and the vicinity thereof. Furthermore, the pressing member 54*a* includes, in the x direction, a pressing submember 54*a*-4 that can press a region corresponding to the discharge port array 33Y of the head unit 24 located at the wiping position, or, in other words, a region encompassing the discharge port array 33Y and the vicinity thereof. In addition, the pressing member 54***a* includes, in the x direction, a pressing submember 54*a*-5 that can press a region corresponding to the discharge port array 33EM of the head unit 24 located at the wiping position, or, in other words, a region encompassing the discharge port array 33EM and the vicinity thereof.

These five pressing submembers 54*a*-1, 54*a*-2, 54*a*-3, 54*a*-4, and 54*a*-5 are arranged in the x direction. In the present embodiment, the pressing member 54*a* includes the pressing submembers 54*a*-1, 54*a*-2, 54*a*-3, 54*a*-4, and 54*a*-5. However, the present invention is not limited to this configuration. To be more precise, the pressing member 54*a* may be formed, in the x direction, as a single member that extends in the x direction so as to be able to press the regions corresponding, respectively, to the discharge port arrays 33K, 33C, 33M, 33Y, and 33EM of the head unit 24 located at the wiping position.

Meanwhile, the pressing member 54*b* is located, in the x direction, at a position shifted from the five pressing submembers 54*a*-1, 54*a*-2, 54*a*-3, 54*a*-4, and 54*a*-5 in the x direction. To be more precise, the pressing member 54*b* is disposed in the x direction so as to be able to press a region encompassing the discharge port array 33RS of the discharge head 25-3 in the head unit 24 located at the wiping position and the vicinity thereof.

A product formed by molding any of various general-purpose resins, engineering plastics, and foams thereof into a desired shape can be used as the pressing members 54. Alternatively, a product formed by molding any of thermosetting resins and foams thereof into a desired shape, a product formed by molding various molded rubber bodies and foams thereof into a desired shape, and the like, can be used as the pressing members 54. The pressing submembers 54*a*-1, 54*a*-2, 54*a*-3, 54*a*-4, and 54*a*-5 and the pressing member 54*b* may be formed from different materials corresponding to the liquids to be discharged from the discharge port arrays 33 to be pressed, or may be formed from the same material. Although each of the pressing members 54 is formed into a cylindrical shape in FIG. 5, the shapes of the pressing members 54 are not limited only to the foregoing. To be more precise, the pressing members 54 can be formed into various publicly known shapes such as a plate shape, a convex shape, and a triangular shape that can appropriately press the wiping member 50 against the discharge port surface 34.

The regulating members 56 include a regulating member 56*a* located on the downstream side in the +y direction and a regulating member 56*b* located on the upstream side in the +y direction. The regulating member 56*a* is disposed at a position substantially coinciding with the pressing member 54*a* in the y direction. Meanwhile, the regulating member 56*a* is disposed at a position on the downstream side in the +x direction of the pressing member 54*a* that substantially coincides with the pressing member 54*b* in the x direction. The regulating member 56*b* is disposed at a position substantially coinciding with the pressing member 54*b* in the y direction. Meanwhile, the regulating member 56*b* is disposed at a position on the upstream side in the +x direction of the pressing member 54*b* that substantially coincides with the pressing member 54*a* in the x direction. The regulating members 56 may be provided in a fixed manner to such positions that make the wiping member 50 stretched between the rotary members 52*a* and 52*b* substantially flat. Alternatively, the wiping member 50 may be configured to be pushed down in the −z direction.

In the case of the wiping operation, a pressed region A1 is formed in which a portion on the downstream side in the +y direction and on the upstream side in the +x direction of the wiping member 50 is pushed up in the +z direction from its back surface 50*a* by the pressing member 54*a*, and, in which a portion on the downstream side in the +x direction thereof is held down from a top surface 50*b* by the regulating member 56*a* (see FIGS. 5 and 6A). In the meantime, a pressed region A2 is formed, in which a portion on the upstream side in the ty direction and on the upstream side in the +x direction of the wiping member 50 is held down from the top surface 50*b* by the regulating member 56*b*, and, in which a portion on the downstream side in the +x direction thereof is pushed up the in the +z direction from the back surface 50*a* by the pressing member 54*b* (see FIGS. 5 and 6B).

The support members 58 press the wiping member 50 in the −z direction at positions on the upstream side and the downstream side in the +y direction of the respective pressing submembers 54*a*-1, 54*a*-2, 54*a*-3, 54*a*-4, 54*a*-5, and 54*b*. In this way, appropriate tension is brought about to the portion of the wiping member 50 pressed by the pressing members 54, thus restricting a contact area of the wiping member 50 with the discharge port surface 34. A length in the x direction of each support member 58 is set in accordance with a length in the x direction of the region to be pressed by each pressing member 54. In the meantime, each support member 58 may be formed from a single member or multiple members in accordance with the length in the x direction on the upstream side or the downstream side in the +y direction of the pressing members 54.

<Control Configuration of Printing Apparatus>

Figure 7:
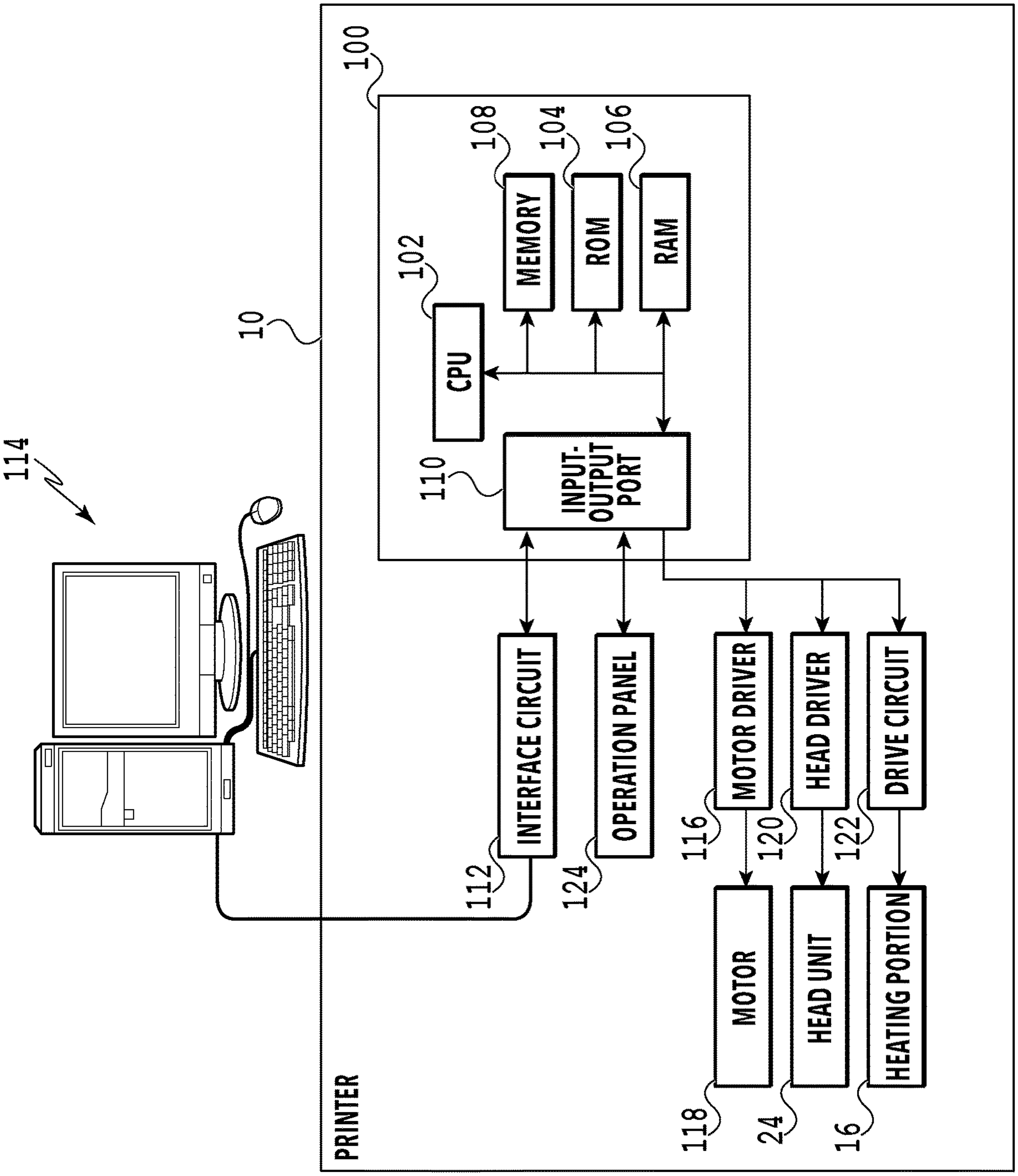
FIG. 7 is a block configuration diagram of a control system of the printing apparatus.

Next, a description will be given of a configuration of a control system of the printing apparatus 10. FIG. 7 is a block configuration diagram of the control system of the printing apparatus 10.

The control portion 100 that controls the entire printing apparatus 10 includes a central processing unit (CPU) 102, a ROM 104, a RAM 106, and a memory 108. The CPU 102 carries out operation control of the respective constituent members in the printing apparatus 10 and processing on inputted image data based on various programs. The ROM 104 stores programs for a variety of control and for the image data processing to be executed by the CPU 102. The RAM 106 stores various data used for the control of the printing apparatus 10. The memory 108 stores various data such as a mask pattern to be described later. Moreover, the control portion 100 includes an input-output port 110 and is connected to various drivers, a drive circuit, and the like, through this input-output port 110.

The control portion 100 is connected to an interface circuit 112 through the input-output port 110, and is connected to a host apparatus 114 through this interface circuit 112. Moreover, the control portion 100 is connected to an operation panel 124, which is operable by a user, through the input-output port 110. The user inputs the image data to the printing apparatus 10 through the host apparatus 114, and inputs a variety of information to the printing apparatus 10 through the host apparatus 114 and the operation panel 124. Meanwhile, the control portion 100 is connected to a motor driver 116 through the input-output port 110, and controls drive of a motor 118 through this motor driver 116. Note that FIG. 7 indicates various motors in the printing apparatus 10 including a motor that moves the carriage 22, a motor that drives the conveyance portion that conveys the print media, a motor that moves the maintenance portion 28, a motor that drives the reeling portion 52, and the like, collectively as the motor 118.

In the meantime, the control portion 100 is connected to a head driver 120 through the input-output port 110, and discharges the inks by controlling the head unit 24 through the head driver 120. The control portion 100 is connected to a drive circuit 122 through the input-output port 110, and controls drive of the heating portion 16 through the drive circuit 122.

In the control portion 100, the CPU 102 converts the image data inputted from the host apparatus 114 into print data and stores the print data in the RAM 106. To be more precise, as the CPU 102 obtains the image data expressed by 256-value information (zero to two hundred fifty-five) in which each of R, G, and B values is an 8-bit value, the CPU 102 converts the image data into multivalued data expressed by using the multiple types of inks (which are K, C, M, Y, and EM in the present embodiment) used for printing. Thus, the multivalued data expressed by a total of 256 8-bit value information (zero to two hundred fifty-five) that determine tones of the respective inks of K, C, M, Y, and EM in each pixel group including multiple pixels are generated as a result of this color conversion processing.

Next, quantization of the multivalued data expressed by K, C, M, Y, and EM is executed. Thus, quantized data (binary data) expressed by two 1-bit value information (0.1) are generated in order to determine either discharge or non-discharge of each of the inks of K, C, M, Y, and EM corresponding to each pixel. This quantization processing may adopt various publicly known quantization methods such as the error diffusion method, the dither method, and the index method. Thereafter, distribution processing is carried out for distributing the quantized data to several scanning operations regarding unit areas of the head unit 24. As a consequence of this distribution processing, the print data expressed by two 1-bit value information (0, 1) that determines discharge or non-discharge of each of the inks of K, C, M, Y, and EM are generated for the respective pixels in the respective scanning operations on the unit areas of the print medium. This distribution processing is executed by using a mask pattern, which corresponds to several times of the scanning operations and is designed to determine permission or non-permission of discharge of the inks to each of the pixels. Note that the above-described generation of the print data is not limited to the execution by the control portion 100. The data generation may be executed by the host apparatus 114, or alternatively, part of the processing may be executed by the host apparatus 114 while the rest of the processing may be executed by the control portion 100.

<Wiping Process>

In the case when the printing apparatus 10 in the above-described configuration starts a printing process to perform printing on the print medium based on the print data, the printing apparatus 10 carries out a wiping process at a predetermined timing in the course of the printing process. Although a description will be given below of the wiping process, the printing apparatus 10 carries out not only the wiping process, but also processes for favorably maintaining and recovering the state of discharge of the liquids from the discharge ports 32 by using various structures provided as the recovery portion 18. Meanwhile, the predetermined timing is any of a timing after the number of discharges of the inks (and the emulsion liquid) from the head unit 24 reaches a predetermined number, a timing after carrying out a predetermined number of times of scanning associated with the printing, and so forth.

Figure 8:
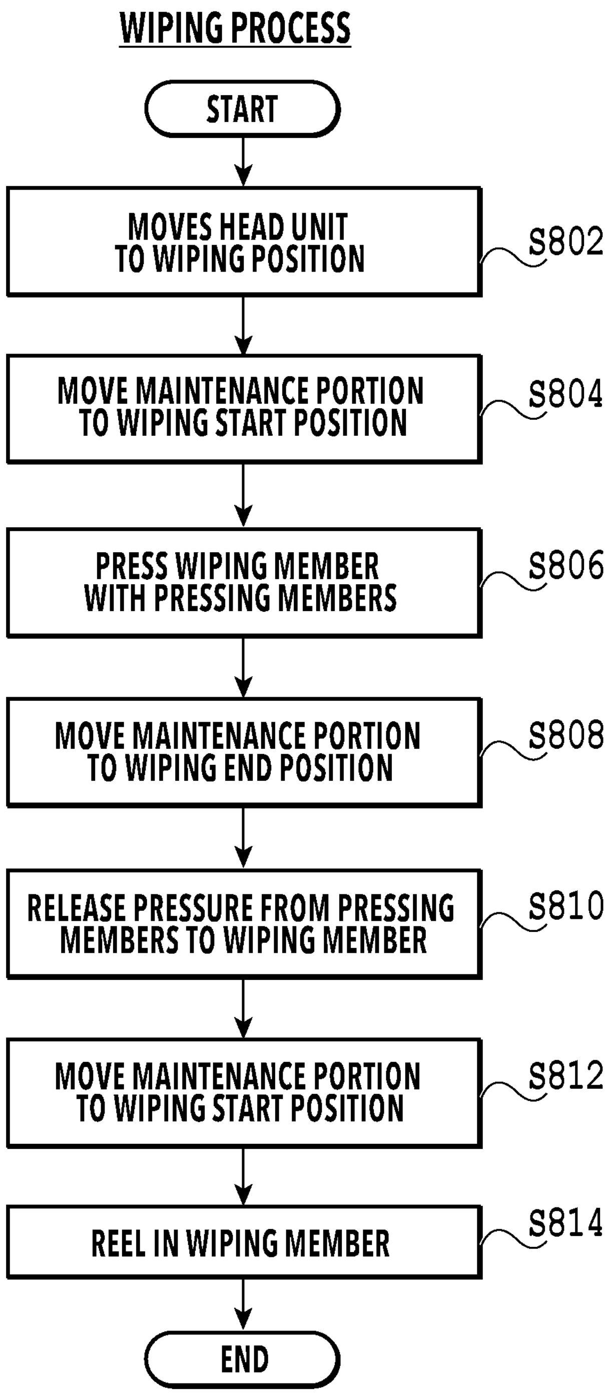
FIG. 8 is a flowchart showing a process routine of a wiping process.

FIG. 8 is a flowchart showing a detailed process routine of the wiping process. FIGS. 9A to 9D are diagrams for explaining a wiping operation of the maintenance portion. FIGS. 10A and 10B are diagrams to explain a comparison between a related art and a technique according to the embodiment. Note that FIGS. 10A and 10B illustrate only the pressing members 54 and the wiping member 50 in order to facilitate the understanding. A series of procedures shown in the flowchart of FIG. 8 is carried out by causing the CPU 102 to load program codes stored in the ROM 104 into the RAM 106 and to execute the program codes. Alternatively, functions of part or all of the steps in FIG. 8 may be executed by use of hardware such as an ASIC and an electric circuit. Note that code S in the description of each procedure means a step in the flowchart.

As the wiping process is started, the CPU 102 first moves the head unit 24 to the wiping position (S802), and moves the maintenance portion 28 to a wiping start position (S804). The wiping start position is a position where the wiping member 50 does not come into contact with the head unit 24 or the carriage 22 in the state that the wiping member 50 is pressed with the pressing members 54, which is located at the position (corresponding to the above-mentioned first position) upstream of the head unit 24 in the +y direction (see FIG. 9A).

Next, the CPU 102 causes the pressing members 54 to press the wiping member 50 (S806), and moves the maintenance portion 28 in the +y direction to a wiping end position while maintaining the pressed state (S808). As the maintenance portion 28 moves in the +y direction from the wiping start position, the pressed region A1 located on the downstream side in the +y direction of the wiping member 50 and pressed by the pressing member 54*a* comes into contact with the discharge port surface 34 (see FIG. 9B). In this instance, the wiping member 50 comes into contact with a region encompassing the discharge port arrays 33K, 33C, 33M, 33Y, and 33EM in the discharge port surface 34 and the vicinities thereof (hereafter referred to as an "ink discharge region" as appropriate, (see FIG. 3)). Meanwhile, the wiping member 50 is held down by the regulating member 56*a* in a region encompassing the discharge port array 33R in the discharge port surface 34 and the vicinity thereof (hereafter referred to as a "reaction liquid discharge region" as appropriate, (see FIG. 3)). Accordingly, the wiping member 50 is kept from being uplifted on a lower side in the reaction liquid discharge region, whereby the wiping member 50 does not come into contact with the reaction liquid discharge region. From this point onward, the ink discharge region is wiped in the pressed region A1 of the wiping member 50 without wiping the reaction liquid discharge region along with the movement of the maintenance portion 28 in the +y direction.

Figure 9A:
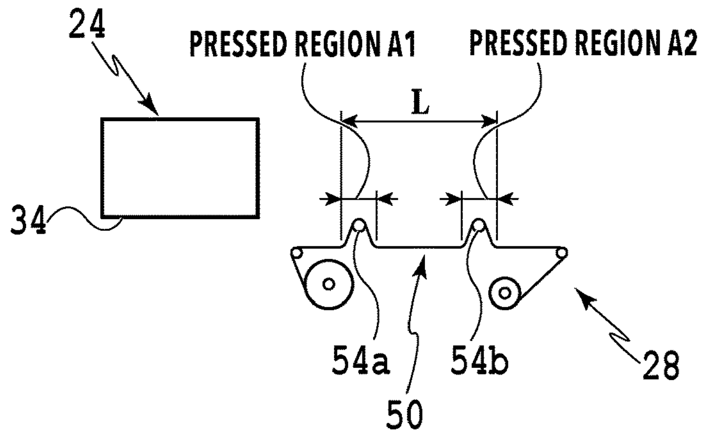
FIGS. 9A to 9D are diagrams for explaining an operation of the maintenance portion at the time of the wiping process.
Figure 9B:
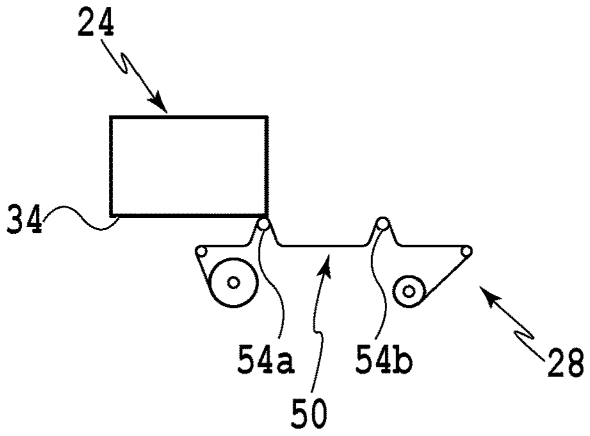
Figure 9C:
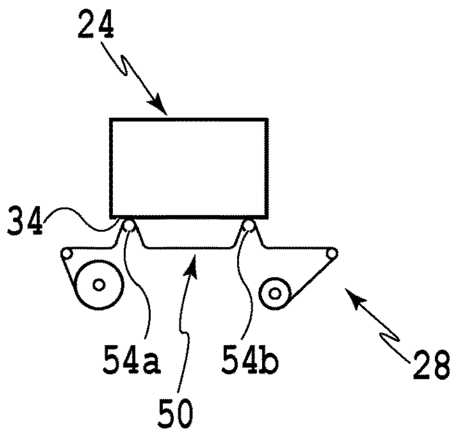
Figure 9D:
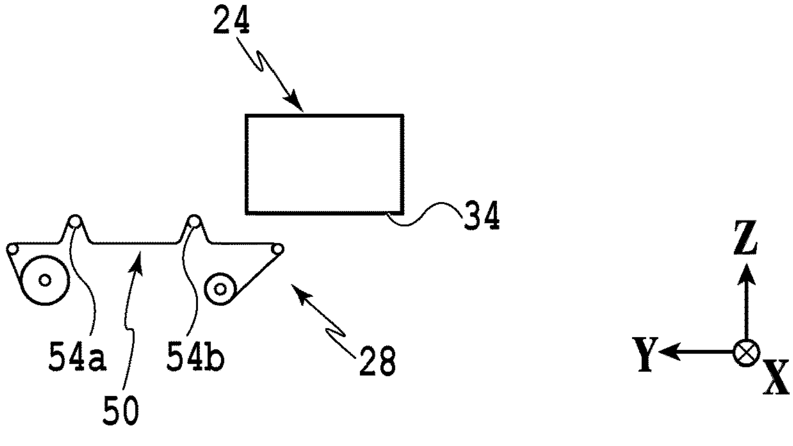
Figure 10A:
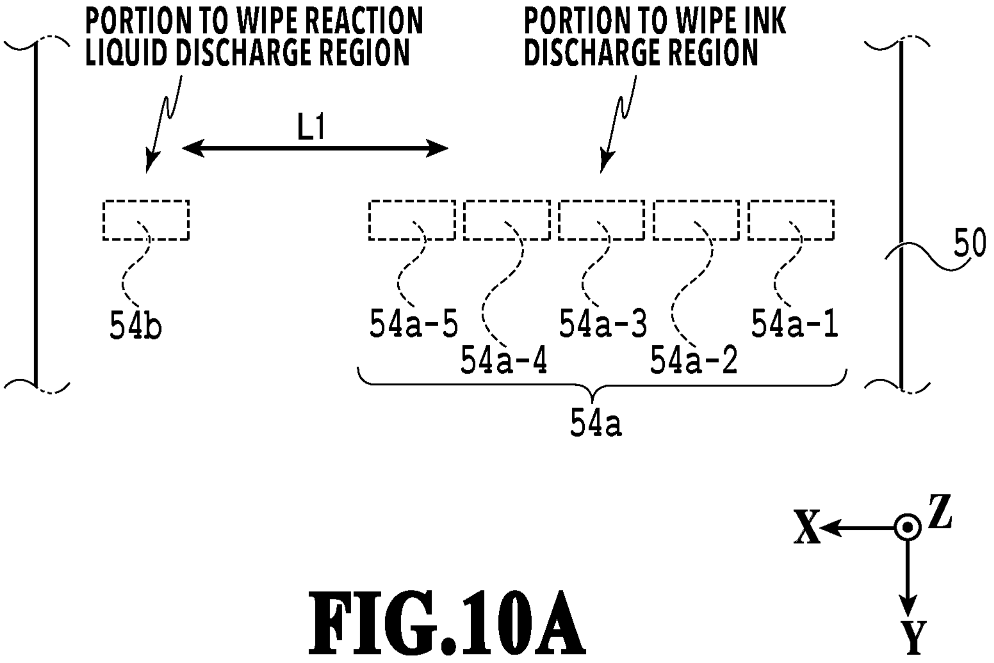
FIGS. 10A and 10B are diagrams showing a distance between positions to wipe a reaction liquid and an ink in a comparative example and in an example.
Figure 10B:
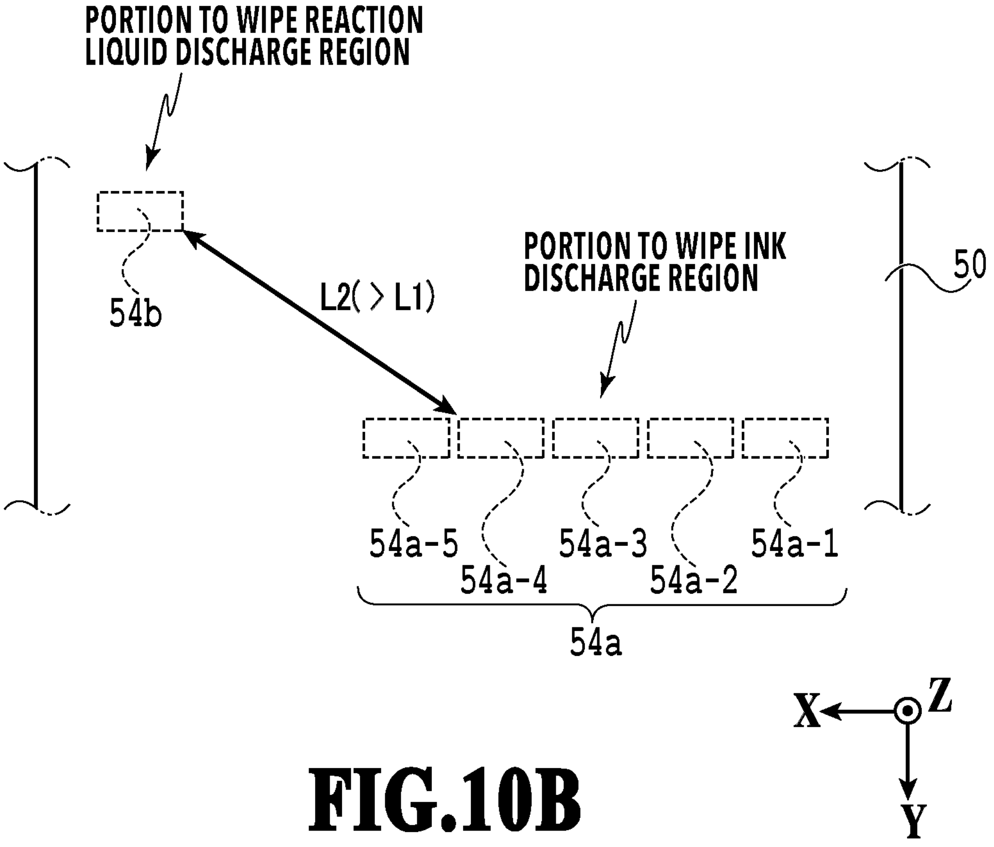

In the meantime, as the maintenance portion 28 moves further in the +y direction, the pressed region A2 located on the upstream side in the ty direction of the wiping member 50 and pressed by the pressing member 54*b* comes into contact with the discharge port surface 34 (see FIG. 9C). In this instance, the wiping member 50 comes into contact with the reaction liquid discharge region of the discharge port surface 34. Meanwhile, the wiping member 50 is held down by the regulating member 56*b* in the ink discharge region of the discharge port surface 34. Accordingly, the wiping member 50 is kept from being uplifted on a lower side in the ink discharge region, whereby the wiping member 50 does not come into contact with the ink discharge region. From this point onward, the reaction liquid discharge region is wiped in the pressed region A2 of the wiping member 50 without wiping the ink discharge region along with the movement of the maintenance portion 28 in the ty direction.

As described above, in S808, the wiping operation on the discharge port surface 34 is carried out by the maintenance portion 28. The wiping end position is a position where the wiping member 50 does not come into contact with the carriage 22 or the head unit 24 in the state that the wiping member 50 is pressed with the pressing members 54, which is located at the position (corresponding to the above-mentioned second position) downstream of the head unit 24 in the +y direction (see FIG. 9D). As described earlier, the CPU 102 imparts the tension to the wiping member 50 by controlling the rotary members 52*a* and 52*b* at the time of the wiping operation.

Now, a case of wiping the ink discharge region and the reaction liquid discharge region at the same time will be considered as a comparative example. In the case of the comparative example, a position of a portion to wipe the ink discharge region and a position of a portion to wipe the reaction liquid discharge region of the wiping member 50 substantially coincide with each other in the y direction that is the direction of movement of the maintenance portion 28 at the time of the wiping (see FIG. 10A). For this reason, the reaction liquid seeping out to the wiping member 50 at the time of wiping is spread mainly from the portion to wipe the reaction liquid discharge region of the wiping member 50, and may reach the portion to wipe the ink discharge region. In this case, the ink seeping into the ink discharge region reacts with the reaction liquid and the ink is therefore solidified. As a consequence, the ink solidified in the course of the wiping operation sticks to a discharge port 32 in the discharge port array 33 located in the ink discharge region, thus causing an ink discharge failure. Such a phenomenon is more likely to develop in a case of using the reaction liquid having high permeability in particular. Meanwhile, this phenomenon is also likely to develop in a case when a mass or a volume of the reaction liquid is small and movement or spread thereof occurs easily such as a case of using the reaction liquid that reacts based on the pH value.

On the other hand, in the wiping member 50 of the printing apparatus 10, the portion to wipe the ink discharge region is located downstream by a predetermined distance in the +y direction of the portion to wipe the reaction liquid discharge region (see FIG. 10B). Accordingly, as compared to the comparative example shown in FIG. 10A, the portion to wipe the ink discharge region is located away from a protruding portion of the reaction liquid discharge region. To be more precise, a distance between the portion to wipe the discharge port array 33RS that discharges the reaction liquid and the portion to wipe the discharge port array 33Y that discharges the Y ink has a value L1 in the comparative example whereas the relevant distance has a value L2 that is greater than the value L1 in the present embodiment (see FIGS. 10A and 10B).

Therefore, the reaction liquid that seeps out to the wiping member 50 during the wiping is less likely to be spread to the portion to wipe the ink discharge region of the wiping member 50. Meanwhile, since the wiping member 50 wipes to the ink discharge region earlier than wiping to the reaction liquid discharge region, the inks that permeate the wiping member 50 are spread earlier therein. For this reason, the reaction liquid will react with the inks seeping out of the portion to wipe the ink discharge region and being located away from this wiping portion, and the solidification of the inks in the vicinity of this wiping portion is suppressed. As a consequence, the reaction liquid is less likely to cause the discharge failure at the discharge port arrays 33 located in the ink discharge region, namely, the discharge port arrays 33K, 33C, 33M, and 33Y.

On the other hand, at the time of wiping the ink discharge region, the wiping member 50 is pushed up by the pressing members 54 at the position corresponding to the ink discharge region of the wiping member 50, and the wiping member 50 is held down by the regulating member 56*a* at the position corresponding to the reaction liquid discharge region of the wiping member 50. At the time of wiping the reaction liquid discharge region, the wiping member 50 is pushed up by the pressing members 54 at the position corresponding to the reaction liquid discharge region of the wiping member 50, and the wiping member 50 is held down by the regulating member 56*b* at the position corresponding to the ink discharge region of the wiping member 50.

As described above, in the maintenance portion 28, the wiping member 50 is held down by the regulating members 56 on the downstream side in the +x direction of the pressed region A1 and on the upstream side in the +x direction of the pressed region A2 of the wiping member 50. Meanwhile, the wiping member 50 is supported by the support members on the upstream side and the downstream side in the +y direction of the respective pressing members 54. According to this configuration, the contact of the portion of the wiping member 50, which does not contribute to wiping during the wiping operation, with the discharge port surface 34 is regulated. Thus, it is possible to prevent the sticking substance that sticks to this portion from sticking again to the discharge port surface 34.

Reference is made back to FIG. 8. After the wiping operation in S808 is completed, the CPU 102 releases the pressure from the pressing members 54 to the wiping member 50 (S810) at the wiping end position, and moves the maintenance portion 28 in the −y direction to the wiping start position while maintaining this state (S812). Since the pressure from the pressing members 54 to the wiping member 50 is released in S812, the wiping member 50 does not come into contact with the discharge port surface 34 in the course of the movement to the wiping start position.

After the maintenance portion 28 returns to the wiping start position, the CPU 102 reels in the wiping member 50 by driving the rotary member 52*b* (S814), and then terminates this wiping process. A reeling amount of the wiping member 50 in S814 is set to an amount corresponding to a length L (see FIG. 9A) from the pressed region A1 to the pressed region A2 in the y direction. The wiping member 50 is reeled in at a certain amount more than the length L in the y direction in consideration of a range, seeping out to the wiping member 50, of the inks, the emulsion liquid, and the reaction liquid at the time of wiping, for example. After reeling in the wiping member 50 in S814, the wiped sticking substances no longer stick to the pressed regions A1 and A2 of the wiping member 50.

As described above, the printing apparatus 10 is configured to wipe the ink discharge region on the discharge port surface 34 provided with the discharge port arrays 33 to discharge the inks and the reaction liquid discharge region thereon provided with the discharge port array 33 to discharge the reaction liquid at different positions in the ty direction of the wiping member 50. In this way, the distance between the wiping portion to wipe the ink discharge region and the wiping portion to wipe the reaction liquid discharge region is increased as compared to the configuration to perform wiping at the same positions in the ty direction of the wiping member 50. Here, the ty direction is the direction of extension of the discharge port arrays 33 and the direction of movement of the maintenance portion 28 in the course of the wiping process. For this reason, the reaction liquid seeping out of the wiping portion is less likely to reach the portion to wipe the ink discharge region. Accordingly, the reaction liquid seeping out in the wiping member 50 is less likely to reach the inks that seep out and the reaction liquid is less likely to cause solidification of the inks. Hence, the chance of occurrence of discharge failures after the wiping process is reduced.

Meanwhile, in the wiping member 50, the portion to wipe the ink discharge region is provided on the downstream side in the ty direction of the portion to wipe the reaction liquid discharge region. Thus, the wiping member 50 is configured to be able to execute the wiping of the ink discharge regions earlier. In this way, the inks that seep out of the wiping portion spread earlier in the wiping member 50. As a consequence, the reaction liquid reacts with the inks at the positions away from the portion to wipe the ink discharge region, whereby the solidification of the inks in the vicinity of the wiping portion is suppressed. Thus, the chance of occurrence of discharge failures after the wiping process is reduced.

In addition, the portions to wipe the ink discharge region and the reaction liquid discharge region are pressed by the pressing members 54. At the same time, the upstream side and the downstream side in the +y direction of the respective wiping regions and the upstream side or the downstream side in the +x direction thereof are pressed by the regulating members 56 and the support members 58. In this way, the contact of the portion in the vicinity of the wiping portion of the wiping member 50, which does not contribute to wiping, with the discharge port surface 34 is regulated. Accordingly, it is possible to prevent the sticking substance that sticks to this portion from sticking again to the discharge port surface 34. Thus, the chance of occurrence of discharge failures after the wiping process is reduced.

Other Embodiments

The above-described embodiment may be modified as described in the following sections (1) to (5).

(1) In the above-described embodiment, the wiping portion of the wiping member 50 to wipe the reaction liquid discharge region of the discharge port surface 34 is formed on the upstream side in the +y direction and the wiping portion thereof to wipe the ink discharge region is disposed on the downstream side in the +y direction. In this way, the wiping member 50 is configured to wipe the ink discharge region earlier. However, the configuration of the maintenance portion 28 is not limited only to the foregoing. For example, the configuration explained in the above-described embodiment may be adopted in the case when the permeability of the reaction liquid into the wiping member 50 is higher than the permeability of the inks or the emulsion liquid into the wiping member 50. On the other hand, the wiping portions are arranged the other way around in a case when the permeability of the reaction liquid into the wiping member 50 is lower than the permeability of the inks or the emulsion liquid into the wiping member 50. Specifically, the wiping portion to wipe the reaction liquid discharge region is formed on the downstream side in the +y direction while the wiping portion to wipe the ink discharge region is disposed on the upstream side in the +y direction, thus achieving a configuration to wipe the reaction liquid discharge region earlier. As mentioned above, the maintenance portion 28 may be configured to wipe such a region earlier, in which the discharge port array 33 to discharge the liquid having the lower permeability into the wiping member 50 is located.

(2) The above-described embodiment is configured to discharge the emulsion liquid from the head unit 24. However, the head unit 24 may be configured not to discharge the emulsion liquid. In this case, the discharge port surface 34 of the head unit 24 is provided with the discharge head 25-1 that discharges the inks and the discharge head 25-3 that discharges the reaction liquid. These heads are disposed at a predetermined distance away from each other in the x direction.

Meanwhile, the above-described embodiment is configured to dispose the discharge head 25-2 that discharges the emulsion liquid between the discharge head 25-1 and the discharge head 25-3 in the x direction and in such a way as to be adjacent to the discharge head 25-1. However, the present invention is not limited only to this configuration. To be more precise, the discharge head 25-2 may be disposed not only at the interval with the discharge head 25-3 but also at a predetermined interval with the discharge head 25-1 in the x direction.

In addition, the above-described embodiment is configured to use the emulsion liquid having the reactivity with the reaction liquid that is lower than the reactivity of the inks with the reaction liquid. However, the present invention is not limited only to this configuration. An emulsion liquid having the reactivity with the reaction liquid that is higher than the reactivity of the inks with the reaction liquid may be used instead. In this case, the discharge head 25-1 is disposed between the discharge head 25-2 and the discharge head 25-3 in the x direction, and the discharge head 25-1 and the discharge head 25-3 are disposed at a predetermined distance away from each other.

(3) Although it is not expressly discussed in the above-described embodiment, the impregnating liquid to impregnate the wiping member 50 preferably adopts a liquid having a surface tension against the wiping member 50 that is lower than surface tensions of the reaction liquid and the inks used therein. This configuration makes it possible to suppress the spread of the inks and the reaction liquid to the wiping member 50.

Regarding the impregnating liquid to suppress the spread of the reaction liquid and the inks, an effect to suppress the spread is greater as the impregnating liquid has a higher viscosity. Nevertheless, it is more difficult to impregnate the wiping member 50 with such a liquid. In the case of using the high-viscosity impregnating liquid, the viscosity is supposed to be reduced by means of dilution, heating, and the like. To be more precise, the impregnating liquid is useful in the case when the liquid has the viscosity in undiluted form in a range from 100 to 10,000 mPa·s. This viscosity is preferably set in a range from 500 to 5000 mPa·s, or more preferably set in a range from 1000 to 2000 mPa·s.

Meanwhile, a greater amount of impregnation (an impregnation amount) of the impregnating liquid has a greater effect of suppressing the spread of the reaction liquid and the inks to the wiping member 50 because absorption of the reaction liquid and the inks by the wiping member 50 is suppressed in this case. On the other hand, an excessive impregnation amount is prone to develop adverse effects such as transfer to the discharge port surface 34 and uneven distribution due to movement in the wiping member 50. In this regard, the impregnation amount is determined while giving comprehensive consideration to the wiping performance, spreading behaviors of the reaction liquid and the inks, the probability of the occurrence of the aforementioned adverse effects, and so forth. In the case of using glycerin as the impregnating liquid, for example, the impregnating amount is set to about 50 g/m$^2$. Moreover, the impregnating liquid having a high surface tension may be used in order to suppress the spread of the reaction liquid and the inks. This makes it possible to suppress the spread of the reaction liquid and the like to the wiping member 50. The surface tension of the impregnating liquid is set equal to or above 50 N/m, for example.

(4) In the above-described embodiment, the printing apparatus 10 is configured to move the head unit 24 in the x direction and the maintenance portion 28 is configured to move in the y direction. However, the present invention is not limited only to this configuration. Specifically, one of the head unit 24 and the maintenance portion 28 may be disposed in a fixed manner, and the remaining head unit 24 or maintenance portion 28 may be configured to move in the x direction and in the y direction. Thus, the head unit 24 and the maintenance portion 28 only need to be movable relative to each other. Meanwhile, in the above-described embodiment, the regulating members 56 and the support members 58 are arranged so as to correspond to the pressing members 54*a* and 54*b*, respectively. However, the present invention is not limited only to this configuration. The regulating members 56 and the support members 58 may be provided to one of the pressing members 54*a* and 54*b* depending on the configuration of the printing apparatus, the inks to be used therein, the type of the reaction liquid, and the like. Furthermore, in the above-described embodiment, the support members 58 are provided both on the upstream side and the downstream side in the +y direction of the pressing members 54. However, the present invention is not limited only to this configuration. The support members 58 may be provided either on the upstream side or on the downstream side in the ty direction of the pressing members 54 depending on the configuration of the printing apparatus, the inks to be used therein, the type of the reaction liquid, and the like.

(5) The above-described embodiment may be combined with one or more of the modes described in the sections (1) to (4) as appropriate.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A printing apparatus comprising:

a printing unit including (1) a first discharge port array formed by arranging a plurality of first discharge ports in a first direction, the first discharge ports being configured to discharge a first ink, (2) a second discharge port array formed by arranging a plurality of second discharge ports in the first direction, the second discharge ports being configured to discharge a reaction liquid to react with the first ink, and (3) a third discharge port array formed by arranging a plurality of third discharge ports in the first direction, the third discharge ports being configured to discharge a second ink that is different from the first ink, the first discharge port array, the second discharge port array, and the third discharge port array being arranged on a discharge port surface in a second direction intersecting with the first direction; and a maintenance unit configured to wipe the discharge port surface by using a wiping member provided with a property to absorb the first ink, the second ink, and the reaction liquid, wherein the discharge port surface is wiped in the first direction with the wiping member by relatively moving at least one of the printing unit and the maintenance unit, wherein a first wiping portion of the wiping member to wipe the first discharge port array and not to wipe the second discharge port array, and a second wiping portion of the wiping member to wipe the second discharge port array and not to wipe the first discharge port array, are located in different positions in the first direction, wherein the first wiping portion and a third wiping portion of the wiping member to wipe the third discharge port array are located in a same position in the first direction, wherein the maintenance unit wipes the second discharge port array after wiping the first discharge port array and the third discharge port array, and does not wipe the first discharge port array or the third discharge port array after wiping the second discharge port array, wherein the first discharge port array, the third discharge port array, and the second discharge port array are arranged in this order in the second direction, wherein, in the second direction, a distance between the second discharge port array and the first discharge port array is greater than a distance between the first discharge port array and the third discharge port array, wherein the wiping member is comprised of a single fabric member reeled in the first direction, and the first and second wiping portions are offset from each other in both of the first direction and the second direction, wherein the first and second wiping portions are formed by first and second pressing portions, respectively, which press the wiping member at positions respectively corresponding to the first and second discharge port arrays, and wherein the first and second pressing portions are offset from each other in both of the first direction and the second direction.

2. The printing apparatus according to claim 1, wherein the maintenance unit includes:

a first pressing member configured to form the first wiping portion by pressing the wiping member at a position corresponding to the first discharge port array; and a second pressing member configured to form the second wiping portion by pressing the wiping member at a position corresponding to the second discharge port array and being different from the first pressing member in the first direction.

3. The printing apparatus according to claim 2, wherein the maintenance unit includes:

a first regulating member located at a position substantially coinciding with the first pressing member in the first direction and configured to regulate uplift of the wiping member in a pressing direction by the first pressing member of the wiping member at a position corresponding to the second discharge port array; and a second regulating member located at a position substantially coinciding with the second pressing member in the first direction and configured to regulate uplift of the wiping member in a pressing direction by the second pressing member of the wiping member at a position corresponding to the first discharge port array.

4. The printing apparatus according to claim 2, wherein the maintenance unit further includes:

a support member located on at least one of an upstream side and a downstream side in the first direction of the first pressing member and the second pressing member, and configured to support the wiping member by pressing the wiping member in an opposite direction to a pressing direction by the first pressing member and the second pressing member.

5. The printing apparatus according to claim 1, wherein the second ink has reactivity with the reaction liquid being lower than reactivity of the first ink.

6. The printing apparatus according to claim 1, wherein the wiping member is impregnated with an impregnating liquid having a surface tension lower than a surface tension of the first ink and a surface tension of the reaction liquid.

7. The printing apparatus according to claim 6, wherein the surface tension of the impregnating liquid is equal to or above 50 N/m.

8. The printing apparatus according to claim 1, wherein the wiping member is impregnated with a liquid having a viscosity in a range from 100 to 10,000 mPa·s.

9. The printing apparatus according to claim 1, wherein the wiping member is provided with stretchiness and flexibility.

10. The printing apparatus according to claim 1, further comprising:

a heating unit configured to heat a print medium after being printed with the printing unit.

11. A maintenance method for a printing apparatus, the printing apparatus including (A) a printing unit including (1) a first discharge port array formed by arranging a plurality of first discharge ports in a first direction, the first discharge ports being configured to discharge a first ink, (2) a second discharge port array formed by arranging a plurality of second discharge ports in the first direction, the second discharge ports being configured to discharge a reaction liquid to react with the first ink, and (3) a third discharge port array formed by arranging a plurality of third discharge ports in the first direction, the third discharge ports being configured to discharge a second ink which is different from the first ink, the first discharge port array, the second discharge port array, and the third discharge port array being arranged on a discharge port surface in a second direction intersecting with the first direction, and (B) a maintenance unit configured to wipe the discharge port surface by using a wiping member provided with a property to absorb the first ink, the second ink, and the reaction liquid, the maintenance method comprising:

wiping the discharge port surface in the first direction by relatively moving at least one of the printing unit and the maintenance unit and by using a first wiping portion to wipe the first discharge port array and not to wipe the second discharge port array, and a second wiping portion to wipe the second discharge port array and not to wipe the first discharge port array, and a third wiping portion to wipe the third discharge port array, wherein in a case where the discharge port surface is wiped, the second discharge port array is wiped with the second wiping portion after the first discharge port array is wiped with the first wiping portion and the third discharge port array is wiped with the third wiping portion, and the first discharge port array is not wiped with the first wiping portion and the third discharge port array is not wiped with the third wiping portion after the second discharge port array is wiped with the second wiping portion, wherein the first wiping portion and the third wiping portion are located in different positions in the first direction of the wiping member from the second wiping portion, wherein in the second direction, a distance between the second discharge port array and the first discharge port array is greater than a distance between the first discharge port array and the third discharge port array, wherein the wiping member is comprised of a single fabric member reeled in the first direction, and wherein the first and second wiping portions are offset from each other in both of the first direction and the second direction, wherein the first and second wiping portions are formed respectively by first and second pressing portions which respectively press the wiping member at positions respectively corresponding to the first and second discharge port arrays, and wherein the first and second pressing portions are offset from each other in both of the first direction and the second direction.

12. The printing apparatus according to claim 1, wherein the wiping member is reeled in the first direction.

13. A printing apparatus comprising:

a first discharge port array formed by arranging a plurality of first discharge ports in a first direction on a discharge port surface, the first discharge ports being configured to discharge a first ink;

a second discharge port array formed by arranging a plurality of second discharge ports in the first direction on the discharge port surface, the second discharge ports being configured to discharge a reaction liquid to react with the first ink;

a third discharge port array formed by arranging a plurality of third discharge ports in the first direction on the discharge port surface, the third discharge ports being configured to discharge a second ink which is different from the first ink; and a maintenance unit configured to wipe the discharge port surface by using a wiping member provided with a property to absorb the first ink, the second ink, and the reaction liquid, wherein the first discharge port array, the second discharge port array, and the third discharge port array are wiped in the first direction with the wiping member by relatively moving at least one of the discharge port surface and the maintenance unit, wherein a first wiping portion of the wiping member to wipe the first discharge port array and not to wipe the second discharge port array, and a second wiping portion of the wiping member to wipe the second discharge port array and not to wipe the first discharge port array, are located in different positions in the first direction, wherein the first wiping portion and a third wiping portion of the wiping member to wipe the third discharge port array are located in a same position in the first direction, wherein the maintenance unit wipes the second discharge port array after wiping the first discharge port array and the third discharge port array, and does not wipe the first discharge port array or the third discharge port array after wiping the second discharge port array, wherein the second discharge port array, the first discharge port array, and the third discharge port array are arranged in this order in the second direction, wherein in the second direction, a distance between the second discharge port array and the first discharge port array is greater than a distance between the first discharge port array and the third discharge port array, wherein the wiping member is comprised of a single fabric member reeled in the first direction, and wherein the first and second wiping portions are offset from each other in both of the first direction and the second direction, wherein the first and second first wiping portions are formed respectively by first and second pressing portions which respectively press the wiping member at positions respectively corresponding to the first and second discharge port arrays, and wherein the first and second pressing portions are offset from each other in both of the first direction and the second direction.

14. The printing apparatus according to claim 13, wherein the wiping member is reeled in the first direction.

15. The printing apparatus according to claim 1, wherein the first and second discharge port arrays are aligned in the second direction along the discharge port surface.

* * * * *